United States Patent [19]

Stempniak

[11] Patent Number: 4,531,881

[45] Date of Patent: Jul. 30, 1985

[54] ADAPTER FOR REFUSE COMPACTING VEHICLE

[76] Inventor: Martin J. Stempniak, 245 S. Maple Ave., Oak Park, Ill. 60302

[21] Appl. No.: 537,864

[22] Filed: Sep. 30, 1983

[51] Int. Cl.[3] .......................... B65F 3/02; B65G 67/04

[52] U.S. Cl. .................................... 414/572; 414/346; 296/26; 193/3; 141/334

[58] Field of Search .................... 414/525 R, 467, 399, 414/346, 345, 343, 572, 567; 298/7; 296/26; 280/727; 141/231, 333, 334; 193/3

[56] References Cited

U.S. PATENT DOCUMENTS

| | | | |
|---|---|---|---|
| 1,874,634 | 8/1932 | Schaupp | 298/7 |
| 2,260,430 | 10/1941 | Blasingame | 141/334 |
| 2,967,056 | 1/1961 | D'Amato | 298/7 |
| 3,220,577 | 11/1965 | Laverne | 414/525 |
| 3,679,078 | 7/1972 | Wetzel | 414/346 |
| 3,779,409 | 12/1973 | Herpich et al. | 414/525 X |
| 4,347,878 | 9/1982 | Schofield | 141/334 X |
| 4,462,747 | 7/1984 | Caplis et al. | 414/567 |

*Primary Examiner*—Leslie J. Paperner
*Assistant Examiner*—David A. Bucci
*Attorney, Agent, or Firm*—Tilton, Fallon, Lungmus & Chestnut

[57] ABSTRACT

A funnel body for mounting at the rear of a garbage compaction truck which includes a rear wall flanked by sidewalls; the sidewalls having lower portions which are generally vertical and upper portions which are outwardly flared; the forward portions of the sidewalls being equipped with a flange and flange secured by cushioning gaskets to the truck body.

6 Claims, 5 Drawing Figures

FIG. 1
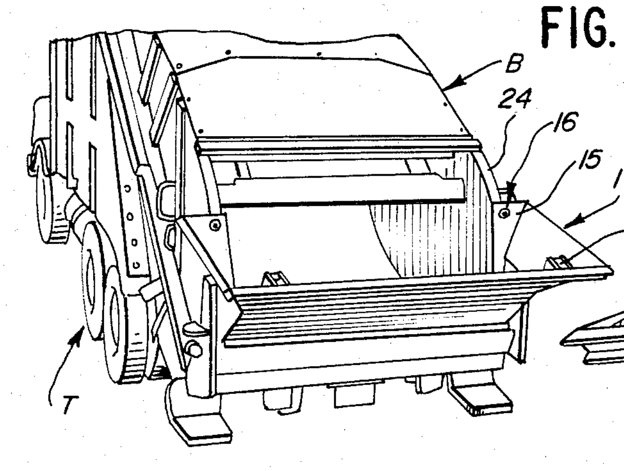
FIG. 2
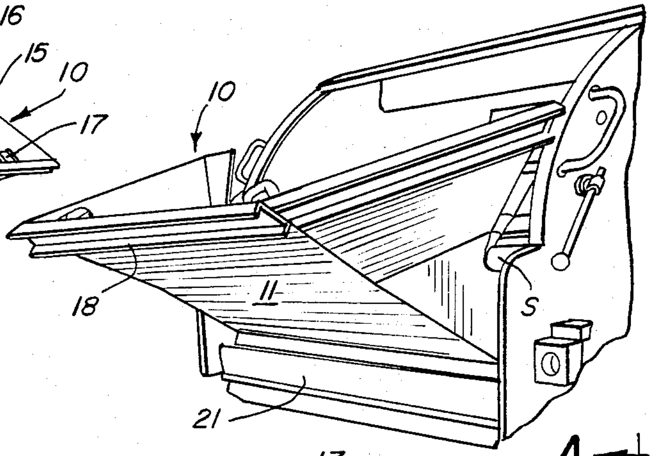
FIG. 3
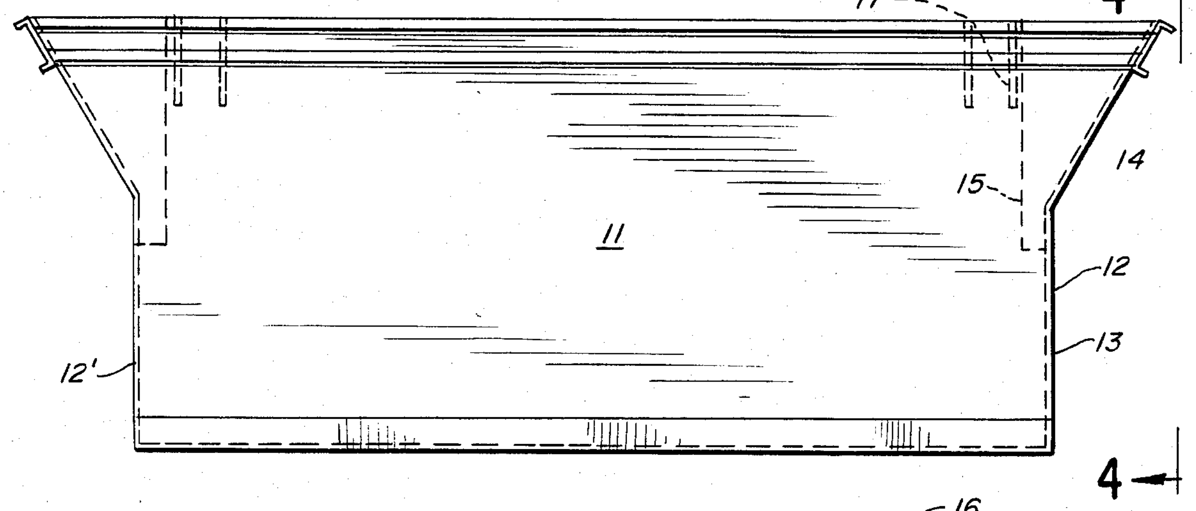
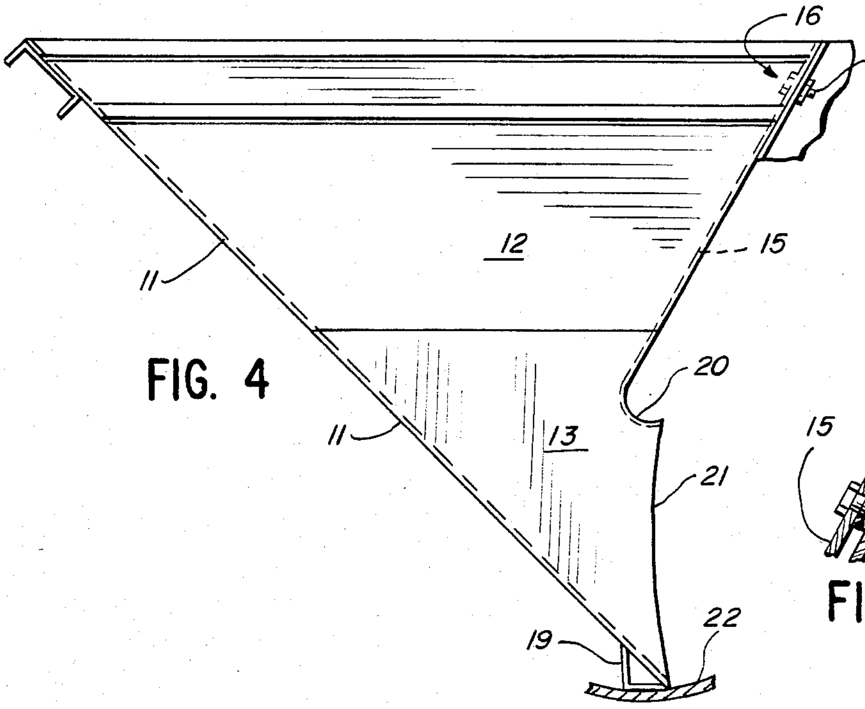
FIG. 4
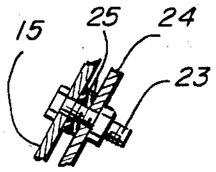
FIG. 4A

ADAPTER FOR REFUSE COMPACTING VEHICLE

BACKGROUND AND SUMMARY OF INVENTION

This invention relates to a leaf funnel or adapter for a refuse compacting vehicle, more commonly referred to as a "garbage truck".

With the emphasis on anti-pollution, leaf burning is no longer tolerated in most communities. This has posed a problem of leaf removal and efforts have been made without success to transfer the leaves by use of a front-end loader bucket to the storage body or refuse storing chamber of a garbage truck. The garbage truck bodies are limited in width for travel over the roads whereas usually the width of the bucket of a front-end loader is somewhat wider. This has resulted in spillage of the leaves incident to the loading of the garbage truck requiring not only additional movement by the loader but generally even manual labor to make sure that all of the spilled leaves are removed from the storage pile—generally along a curb. In consequence, the common expedient has been more costly—using the front-end loader to put the leaves into a dump truck. Thus, no real compaction is possible and the leaf removal correspondingly expensive, viz., of the order of at least about 4–5 times based upon the lack of compaction.

Efforts have been made in the past to remedy this through the use of hopper-like adapters constructed of wood but without significant effect. According to the invention a uniquely designed funnel is provided, constructed entirely of metal and which is readily installed (when needed) into the access opening of the truck body. More particularly, the construction of the inventive funnel includes an angularly inclined rear wall and flanking sidewalls. The sidewalls adjacent the lower portions thereof are vertical and outwardly flared thereabove, preferably less than 50% of the overall height of the hopper. Additionally, the sidewalls adjacent their forward ends are equipped with flange means which serve to secure the hopper to the vehicle in rigid, stable fashion. By use of the instant invention, the compaction of wet leaves is particularly advantageous—squeezing moisture from the leaves and draining the same reduces the weight of the load to be transferred to the dump site.

Other objects and advantages of the invention may be seen in the details of the ensuing specification.

The invention is described in conjunction with an illustrative embodiment in the accompanying drawing, in which FIG. 1 is a fragmentary perspective view of a refuse vehicle having the inventive funnel mounted thereon and viewed essentially from the rear;

FIG. 2 is another fragmentary perspective view similar to FIG. 1 but viewed from a more forward angle;

FIG. 3 is a rear elevational view of the inventive funnel; and

FIG. 4 is a side elevational view taken along the sight line 4—4 applied to FIG. 3 with FIG. 4A being in enlarged detail in fragmentary section of the means for securing the funnel to the compactor body.

DETAILED DESCRIPTION

In the illustration given, and with reference first to FIG. 1, the symbol T designates generally a compaction-type garbage truck which is equipped with a conventional refuse receiving body generally designated by the symbol B. The body has an access opening for the receipt of refuse made possible by a moving door and installed for communication with this opening is the inventive funnel generally designated 10.

As can be best seen in FIG. 2, the funnel 10 is equipped with an inclined rear wall 11—see also FIG. 4. This is flanked by sidewalls 12 and 12'—referring to FIG. 3. The sidewalls are essentially mirror images of each other so only one sidewall needs to be described in detail.

Still referring to FIG. 3, the lower portion 13 of the sidewall 12 is seen to be vertically disposed and the sidewalls in their vertical portions are spaced apart a distance suitable for fitting into the access opening of the truck body. This may normally run about 76".

Preferably the lower portion 13 of the sidewalls 12, 12', extend slightly over half the overall height of the funnel. The remaining or upper portions of the sidewalls as at 14 are outwardly flared and at an angle of about 30°. In the illustration given, this results in a funnel mouth of about 94" in width which is adequate to overlap the width dimension of conventional front end loaders and thus insure that leaves being deposited in the funnel are all guided into the hopper itself with no side spillage.

At the extreme forward end of the funnel are provided flanges as at 15 which extend inwardly and are generally aligned with the upper portions 14 of the sidewalls 12. The flanges 15 provide an advantageous means for securing as at 16 (see FIG. 1) the funnel 10 to the truck body B.

Also provided are lifting clips as at 17 for the convenient securement of the funnel 10 incident to being installed on the truck body B.

I have found that it is advantageous to construct the walls 11, 12 and 12' of 10 gauge steel suitably framed by channels at the upper edges as at 18 (see FIG. 2) and rigidified at the base by means of an angle 19 (see FIG. 4). The flanges 15 are advantageously constructed of ¼" steel plate.

One widely used truck body is manufactured by the Leach Company of Oshkosh, Wis. and has a stub shaft S (see FIG. 2) which projected inwardly of the access opening to the truck body. This is accommodated in the illustration given by terminating the flange 15 midway of the height of the stub shaft S (see FIG. 4) and arcuately shaping as at 20 the upper edge of the forwardly projecting part of the lower portion 13 of the sidewall 12. The forwardly projecting part is designated 21 in FIG. 4 and is seen to extend forwardly of the lower end of the flange 15, providing additional advantageous guidance for the leaves entering the refuse chamber in the body B.

The truck is usually equipped with a trough 22 (compare FIGS. 2 and 4) which either may be fixed or pivoted to accommodate roll-away refuse containers. This trough supports the weight of the funnel 10 and prevents substantial movement thereof. The funnel is secured by the means 16 shown in greater detail in FIG. 4A. There a nut-equipped bolt 23 is mounted in aligned openings in the flange 15 and the confronting truck body flange 24. Advantageously, resilient cushioning material such as rubber washers 25 may be installed between the two flanges 15 and 24 to avoid metal-to-metal contact which might, upon the truck hitting a bump, cause tearing of the metal or other deleterious wear, rupture, etc.

While in the foregoing specification, a detailed description of an embodiment of the invention has been set down for the purpose of illustration, many variations in the details herein given may be made by those skilled in the art without departing from the spirit and scope of the invention.

I claim:

1. A leaf funnel for a refuse removal vehicle which has a generally rectangular opening of predetermined width yielding access to a refuse compacting chamber, said funnel including a unitary metal hopper body having an inclined rear wall and flanking sidewalls, said rear and sidewalls at the lower portions thereof being sized to conform to said predetermined width opening, the upper portions of said sidewalls being outwardly flared whereby the bucket of a loader having a width greater than said opening width is adapted to load leaves into said chamber without substantial spillage, and flange means along said sidewall upper portions extending inwardly of said funnel and constituting partial front walls for said body, said flange means being adapted to be secured to said vehicle.

2. The structure of claim 1 in which said outwardly flared upper portions of said sidewalls are at an angle of about 30° to the vertical and said upper portions constitute less than about 50% of the height of said hopper body.

3. The structure of claim 1 in which said sidewall lower portions extend forwardly of the lower ends of said flange means.

4. The structure of claim 1 in which said funnel is provided with cushion-equipped bolt means for securing the same to said vehicle.

5. A metal funnel adapted to guide leaves from a front end loader into the storage chamber of a compacting refuse truck or the like comprising a downwardly forwardly sloped rear wall flanked by forwardly extending sidewalls, the lower portions of said sidewalls being substantially vertical and the upper portions of said sidewalls flaring outwardly at an angle of about 30°, each sidewall being equipped at its forward end with an inwardly extending flange adapted to be secured to the body of said compacting refuse truck, and clip means on the upper portion of said rear wall for lifting said funnel body into and out of place on said truck.

6. The structure of claim 5 in combination with said refuse compacting truck having a flanged upper body and a supporting trough, the weight of said funnel being supported by said trough and said funnel being resiliently secured to said upper truck body.

* * * * *